US008427689B2

(12) United States Patent
Puri

(10) Patent No.: US 8,427,689 B2
(45) **Date of Patent: *Apr. 23, 2013**

(54) PRINT JOB DATA PROCESSING FOR MULTI-HEAD PRINTERS

(75) Inventor: Anish N. Puri, Westford, MA (US)

(73) Assignee: Zink Imaging, LLC, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/232,723

(22) Filed: Sep. 14, 2011

(65) Prior Publication Data

US 2012/0001969 A1 Jan. 5, 2012

Related U.S. Application Data

(60) Continuation of application No. 12/187,155, filed on Aug. 6, 2008, now abandoned, which is a division of application No. 10/806,627, filed on Mar. 23, 2004, now Pat. No. 7,416,267.

(51) Int. Cl.
*G06F 15/00* (2006.01)

(52) U.S. Cl.
USPC ............. 358/1.15; 358/1.14; 358/1.17; 347/9

(58) Field of Classification Search ................. 358/1.15, 358/1.14, 1.17; 347/9
See application file for complete search history.

(56) References Cited

U.S. PATENT DOCUMENTS 4,524,368 A 6/1985 Inui et al.
4,660,052 A 4/1987 Kaiya et al.
4,997,410 A 3/1991 Polster et al.
5,119,108 A 6/1992 Hatakeyama
5,450,099 A 9/1995 Stephenson et al.
5,712,890 A 1/1998 Spivey et al.
5,852,683 A 12/1998 Jewel
6,269,177 B1 7/2001 Dewaele et al.
6,459,094 B1 10/2002 Wang et al.
6,535,293 B1 3/2003 Mitsuhashi
6,672,697 B2 * 1/2004 Haflinger ........................ 347/12
6,746,103 B2 * 6/2004 Tanuma .......................... 347/40
6,961,084 B1 11/2005 Duncan et al.
7,240,986 B2 7/2007 Ikemoto et al.
7,388,686 B2 6/2008 Saquib et al.
2001/0014229 A1 8/2001 Nakata et al.

(Continued)

FOREIGN PATENT DOCUMENTS

GB 2 304 951 A 3/1997
JP 63-102951 5/1988
JP 64-004357 1/1989

OTHER PUBLICATIONS

International Search Report, PCT/US2005/009754, mailed Jun. 16, 2006.

*Primary Examiner* — Mark K Zimmerman
*Assistant Examiner* — Mark Milia
(74) *Attorney, Agent, or Firm* — Foley & Lardner LLP; Michel Morency

(57) ABSTRACT

Techniques are disclosed for performing processing, such as striping, staggering, and stitching, on print data prior to printing by a multi-head printer. Subsets of the print data may be stored in multiple stages of buffers and processed in parallel to increase processing efficiency. Print data representing digital photographs may be processed sufficiently rapidly to enable continuous printing of digital photographs at high speeds. Parameters of the system, such as print buffer size and interrupt frequency, may be varied in response to design requirements such as overall system cost.

15 Claims, 16 Drawing Sheets

U.S. PATENT DOCUMENTS

2002/0057306 A1 * 5/2002 McDonald ...................... 347/14
2002/0191067 A1 12/2002 Nakajima et al.
2004/0095420 A1 * 5/2004 Ikemoto et al. ................. 347/40
2004/0119767 A1 * 6/2004 Takekoshi et al. .............. 347/12

* cited by examiner

PRINT JOB DATA PROCESSING FOR MULTI-HEAD PRINTERS

RELATED APPLICATIONS

This application is a continuation of U.S. patent application Ser. No. 12/187,155, filed Aug. 6, 2008, which is a divisional of U.S. patent application Ser. No. 10/806,627, filed Mar. 23, 2004 and which issued as U.S. Pat. No. 7,416, 267 on Aug. 26, 2008. The entire contents of the foregoing applications are hereby incorporated herein by reference in their entireties.

BACKGROUND

1. Field of the Invention

The present invention relates to multi-head printers and, more particularly, to techniques for processing print data for printing by multi-head printers.

2. Related Art

Various kinds of printers are well-known in the computer and digital imaging arts. Such printers include, for example, dot-matrix printers, laser printers, inkjet printers, and thermal printers. Thermal printers use thermal energy (heat) to produce printed output. More specifically, thermal printers typically contain a linear array of heating elements (also referred to herein as "print head elements") that print on an output medium by, for example, transferring pigment from a donor sheet to the output medium or by initiating a color-forming reaction in the output medium. The output medium is typically a porous receiver receptive to the transferred pigment, or a paper coated with the color-forming chemistry. Each of the print head elements, when activated, forms color on the medium passing underneath the print head element, creating a spot having a particular density. Regions with larger or denser spots are perceived as darker than regions with smaller or less dense spots. Digital images are rendered as two-dimensional arrays of very small and closely-spaced spots.

A thermal print head element is activated by providing it with energy. Providing energy to the print head element increases the temperature of the print head element, causing either the transfer of pigment to the output medium or the formation of color in the receiver. The density of the output produced by the print head element in this manner is a function of the amount of energy provided to the print head element. The amount of energy providing to the print head element may be varied by, for example, varying the amount of power to the print head element within a particular time interval or by providing power to the print head element for a longer time interval.

A single thermal printer may include multiple thermal print heads, in which case the data to be printed is divided into a plurality of portions, referred to as "stripes," each of which is printed by one of the print heads. The process of dividing the print data into stripes is referred to as "striping." Multi-head thermal printers can be superior to single-head printers for cost and reliability reasons, particularly when wide printing is required. For example, the cost of a single wide head typically is significantly greater than the total cost of multiple small heads having the same aggregate width as the single wide head. Furthermore, the manufacturing yield for wide heads is very low compared to that of small heads. In addition, when a pixel fails in one print head in a multi-head printer, only the failing print head need be replaced, while the failure of a single printer in a single large print head requires the entire print head to be replaced at a much higher cost.

The print heads in a multi-head printer may be staggered with respect to each other. One example of this kind of printer is described in U.S. Pat. No. 4,660,052 to Kaiya et al., and is described as a heat-sensitive recording apparatus with multiple thermal heads disposed in a staggered arrangement along two platen rollers. The apparatus has alternate image segments printed on a first platen roller by a first set of print heads. The intervening segments are filled in by a second set of print heads printing on a second platen roller. The heads are arranged such that the printing of the second set of print heads overlaps the printing of the first set of print heads, forming "stitching" regions between each pair of adjacent segments in which the printing may be adjusted to obscure the presence of a transition from one to the other.

The use of stitching regions may create undesirable visible artifacts in the printed image if adequate preventative steps are not taken. Various techniques have been employed to "stitch" image segments within stitching regions so that the presence of the stitching regions is imperceptible to the greatest extent possible. Stitching techniques include techniques for performing image processing on stitched image segments prior to printing, mechanical techniques for properly printing stitched image segments with proper alignment, and combinations thereof. Particular examples of stitching techniques may be found, for example, in a commonly-owned patent application Ser. No. 10/374,847, filed on Feb. 25, 2003, and entitled "Image Stitching for a Multi-Head Printer."

Striping and stitching are merely two examples of kinds of processing that may need to be performed on print data before it is provided to the print heads for printing. As the speed of multi-head printers continues to increase and as price competition among printer manufacturers continues to increase, it is becoming increasingly important that techniques for performing striping, stitching, and other image processing techniques be capable of processing print data both quickly and inexpensively.

SUMMARY

Techniques are disclosed for performing processing, such as striping, staggering, and stitching, on print data prior to printing by a multi-head printer. Subsets of the print data may be stored in multiple stages of buffers and processed in parallel to increase processing efficiency. Print data representing digital photographs may be processed sufficiently rapidly to enable continuous printing of digital photographs at high speeds. Parameters of the system, such as print buffer size and interrupt frequency, may be varied in response to design requirements such as overall system cost.

Other features and advantages of various aspects and embodiments of the present invention will become apparent from the following description and from the claims.

DETAILED DESCRIPTION

Figure 1:
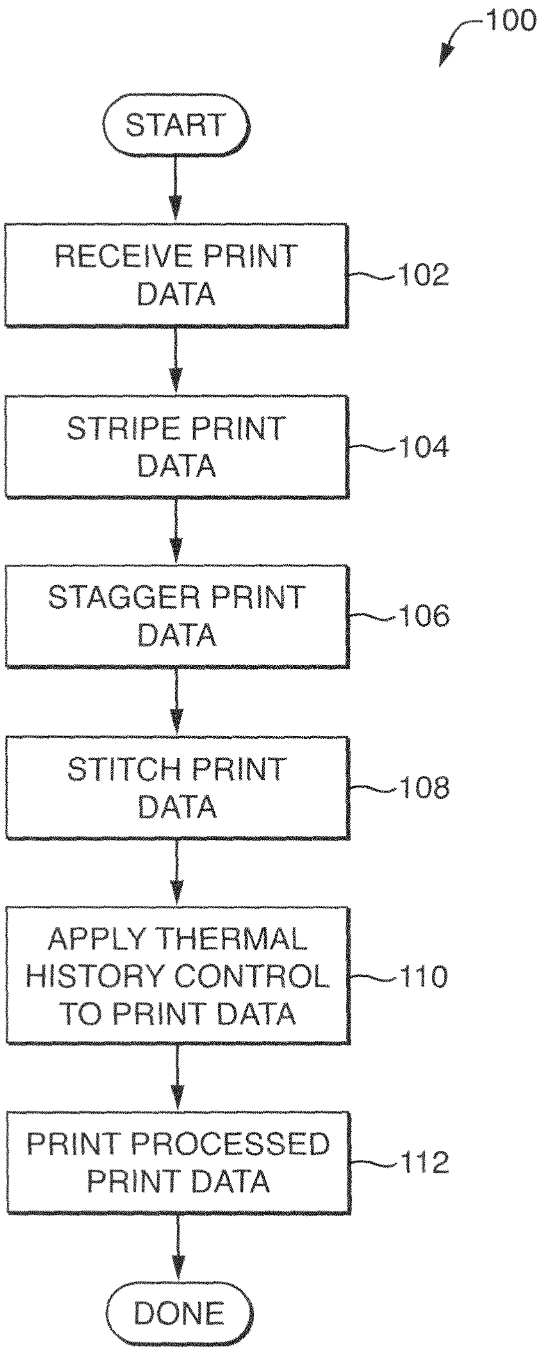
FIG. 1 is a flowchart of a method that is used in one embodiment of the present invention to perform a print job.
Figure 2:
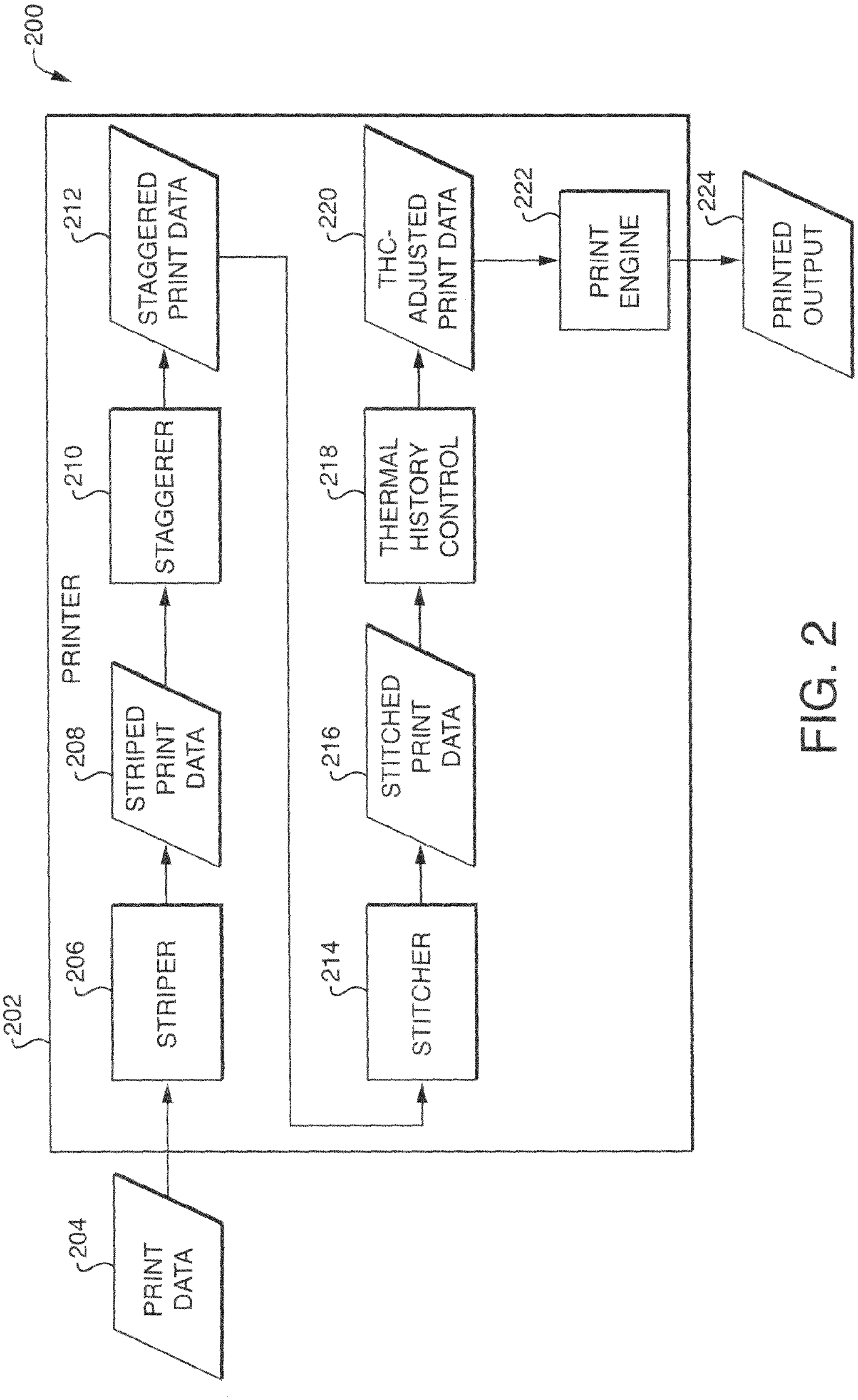
FIG. 2 is a functional block diagram of a system that performs the method of FIG. 1 according to one embodiment of the present invention.

Examples of techniques will now be described for processing print data in a multi-head print data in accordance with embodiments of the present invention. Referring to FIG. 1, a flowchart is shown of a method 100 that is used in one embodiment of the present invention to perform a print job. Referring to FIG. 2, a functional block diagram is shown of a system 200 that includes a multi-head printer 202 that may perform the method 100 of FIG. 1.

The printer 202 receives print data 204 to be printed in a print job (step 102). The print data 204 may be any kind of data to print on an output medium. The print data 204 may, for example, be one or more color digital photographs or other digital images represented in a format suitable for input to the printer 202. The printer 202 includes a striper 206 which receives the print data 204 and stripes it to produce striped print data 208 (step 104). Examples of particular techniques that may be used for performing striping will be described below with respect to FIG. 8. The printer 202 includes a staggerer 210 which staggers the striped print data 208 to produce staggered print data 212 (step 106). Examples of particular techniques that may be used to performing staggering will be described below with respect to FIGS. 9-10.

The printer 202 also includes a stitcher 214 which receives the staggered print data 212 and stitches it to produce stitched print data 216 (step 108). Examples of particular techniques that may be used to performing stitching are described in the above-referenced patent application entitled "Image Stitching for a Multi-Head Printer." The printer 202 also includes a thermal history control engine 218 which performs thermal history control on the stitched printer data 116 to produce thermal history control-adjusted print data 220 (step 110). Examples of particular techniques that may be used to performing thermal history control are described in commonly-owned patent application Ser. No. 09/934,703, filed on Aug. 22, 2001, entitled "Thermal Response Correction System."

The printer 202 also includes a print engine 222 which renders and prints (step 112) the thermal history control-adjusted print data 220, thereby producing printed output 224. Examples of the print engine 222 are described in the above-referenced patent application entitled "Image Stitching for a Multi-Head Printer." The printed output 224 may, for example, be one or more color digital photographs or other image printed on a wide-format output medium.

Figure 3:
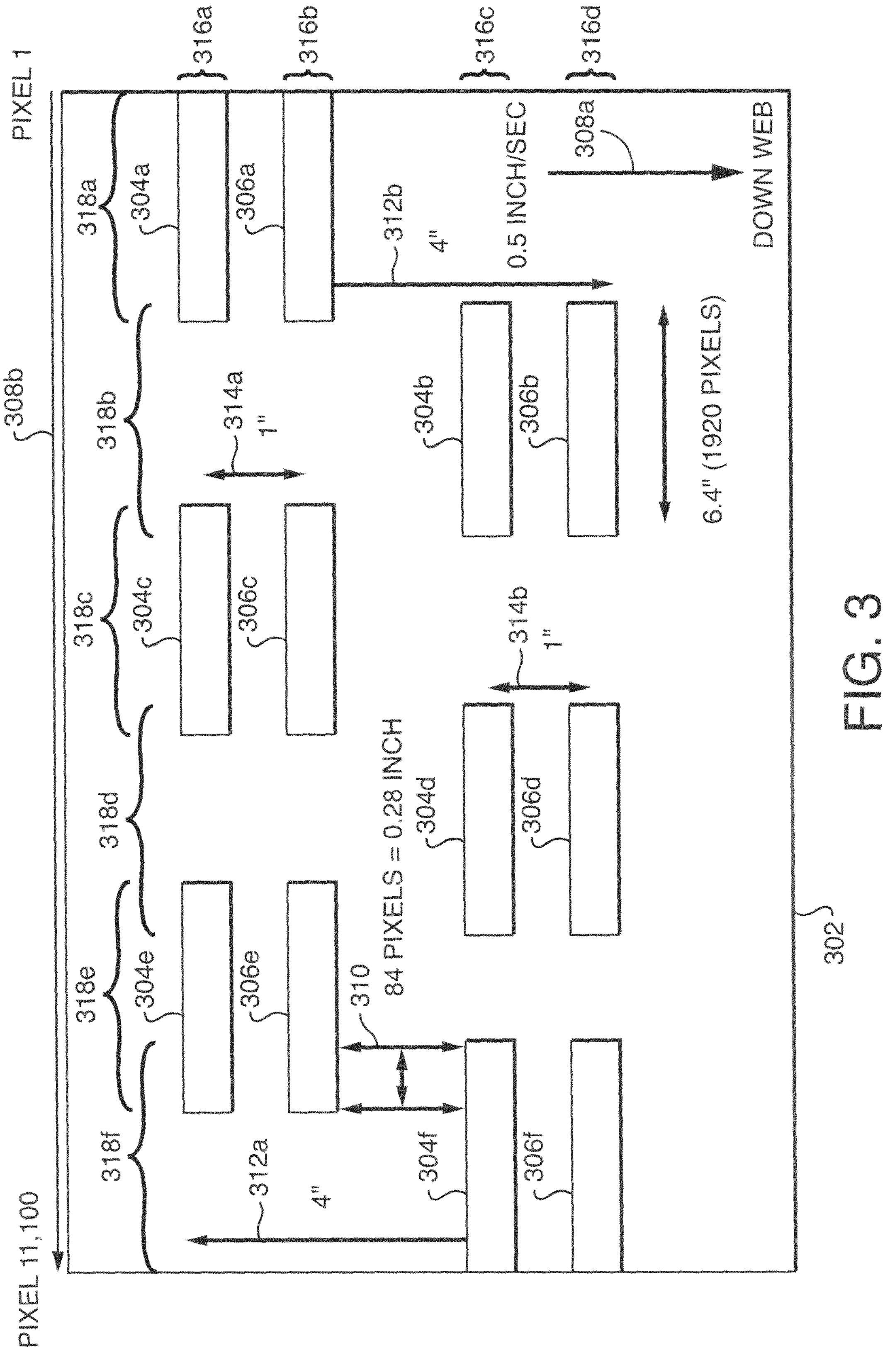
FIG. 3 is a diagram illustrating the layout of a plurality of print heads according to one embodiment of the present invention.

Referring to FIG. 3, a diagram is shown of the layout of a plurality of print heads 304*a-f* and 306*a-f* according to one embodiment of the present invention. The print heads 304*a-f* and 306*a-f* may, for example, be part of the print engine 222 (FIG. 2).

In the particular example illustrated in FIG. 3, there are six magenta/yellow (M/Y) print heads 304*a-f* and six cyan (C) print heads 306*a-f*. The techniques disclosed herein may, however, be used in conjunction with any number of print heads of any kind. For example, there may be separate magenta and yellow print heads, rather than the combined magenta/yellow print heads 304*a-f* shown in FIG. 3. Furthermore, although the print 304*a-f* and 306*a-f* are described herein as having particular dimensions, resolutions, and other properties, embodiments of the present invention are not limited to use in conjunction with print heads having such properties.

Print heads 304*a-f* and 306*a-f* print output on an output medium 302 which passes underneath the print heads 304*a-f* and 306*a-f* in down-web direction 308*a*. In the particular example illustrated in FIG. 3, the output medium is 37 inches wide (i.e., in cross-web direction 308*b*). At any particular point in time, each of the print heads 304*a-f* and 306*a-f* prints on the portion of the output medium 302 that is underneath the print head at that time. In the following discussion, it is assumed for purposes of example that the output medium 302 moves in the down-web direction 308*a* at a speed of 0.5 inches per second.

In one embodiment of the present invention, each of the print heads 304*a-f* and 306*a-f* is 6.4 inches wide and has a resolution of 300 dots per inch (dpi). As a result, each of the print heads 304*a-f* and 306*a-f* includes 1920 print head elements and therefore prints lines of pixels that are 1920 pixels wide (i.e., in cross-web direction 308*b*).

Print heads 304*a-f* and 306*a-f* are arranged in rows 316*a-d*. More specifically, row 316*a* contains magenta/yellow print heads 304*a*, 304*c*, and 304*e*; row 316*b* contains cyan print heads 306*a*, 306*c*, and 306*e*; row 316*c* contains magenta/yellow print heads 304*b*, 304*d*, and 304*f*; and row 316*d* contains cyan print heads 306*b*, 306*d*, and 306*f*.

Print heads 304*a-f* and 306*a-f* are also arranged in columns 318*a-f*. More specifically, column 318*a* contains magenta/yellow print head 304*a* and cyan print head 306*a*; column 318*b* contains magenta/yellow print head 304*b* and cyan print head 306*b*; column 318*c* contains magenta/yellow print head 304*c* and cyan print head 306*c*; column 318*d* contains magenta/yellow print head 304*d* and cyan print head 306*d*; column 318*e* contains magenta/yellow print head 304*e* and cyan print head 306*e*; and column 318*f* contains magenta/yellow print head 304*f* and cyan print head 306*f*.

Assume that pixels are numbered in the cross-web direction 308*b* beginning with pixel 1 on the right-hand side of FIG. 3 and ending with pixel 11,100 (300 dpi×37 inches) on the left-hand side of FIG. 3. A pixel "line" refers herein to a single row of 11,100 pixels. Print heads 304*a-f* and 306*a-f* are distributed within columns 318*a-f* such that each pixel in a line is printed by at least one of the magenta/yellow print heads 304*a-e* and at least one of the cyan print heads 306*a-f*.

Print heads 304*a-f* and 306*a-f* are also arranged so that there is some cross-web overlap between the output of the print heads 304*a-f* and 306*a-f*. For example, columns 318*e* and 318*f* overlap in region 310. Region 310 includes 84 pixels (0.28 inches) in the cross-web direction 308*b* in which the output of heads 304*e* and 306*e* overlaps with the output of heads 304*f* and 306*f*. Region 310 is an example of a stitching region in which stitching techniques, such as those disclosed in the above-referenced patent application entitled "Image Stitching for a Multi-Head Printer," may be employed.

Print heads in each of the columns 318*a-f* are separated from each other by one inch in the down-web direction 308*a*. For example, magenta/yellow head 304*c* is separated by one inch 314*a* from cyan head 306*c* in the down-web direction 308*a*, just as magenta/yellow head 304*d* is separated by one inch 314*b* from cyan head 306*d* in the down-web direction 308*a*.

Print heads of the same color in different ones of the rows 316*a-d* are separated from each other by four inches in the down-web direction. For example, magenta/yellow head 304*e* (in row 316*a*) is separated by four inches 312*a* from magenta/yellow head 304*f* (in row 316*c*), and cyan head 306*a* (in row 316*b*) is separated by four inches 312*b* from cyan head 306*b* in the down-web direction 308*a*. The particular arrangement of the print heads 304*a-f* and 306*a-f* illustrated in FIG. 3 is provided merely for purposes of example and does not constitute a limitation of the present invention.

It is desirable to provide print data to the print engine 222 quickly enough that the print engine 222 is capable of continuously printing the print data 204. If the print data 204 cannot be provided to the print data 204 sufficiently rapidly, the print engine 222 may stop and restart at various times during the print job, thereby increasing the total time required to print the job. Furthermore, starting and stopping the print engine 222 causes "banding" to appear in the printed output 224 as the result of thermal bleed caused by the stalled print heads. Such banding typically makes the printed output 224 unacceptable for use, thereby requiring the print data 204 to be reprinted. As the speed of print engines continues to increase it is becoming increasingly necessary to perform processing on print data (such as the processing performed by the method 100 illustrated in FIG. 1) as efficiently as possible to ensure that print data may be provided continuously to the print engine 222.

Figure 4A:
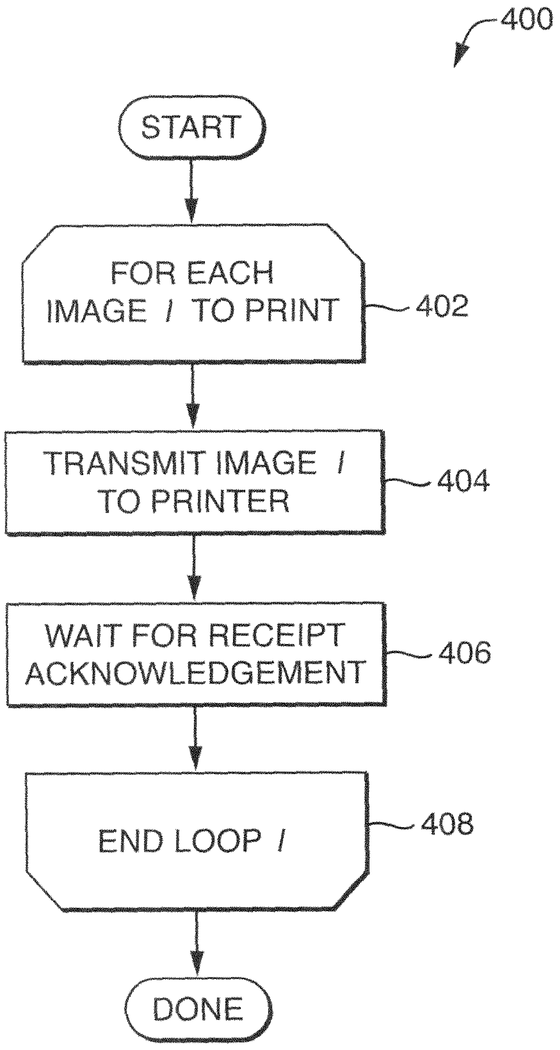
FIGS. 4A-4F are flowcharts of methods that are used by the printer of FIG. 2 to print a print job according to one embodiment of the present invention.
Figure 4B:
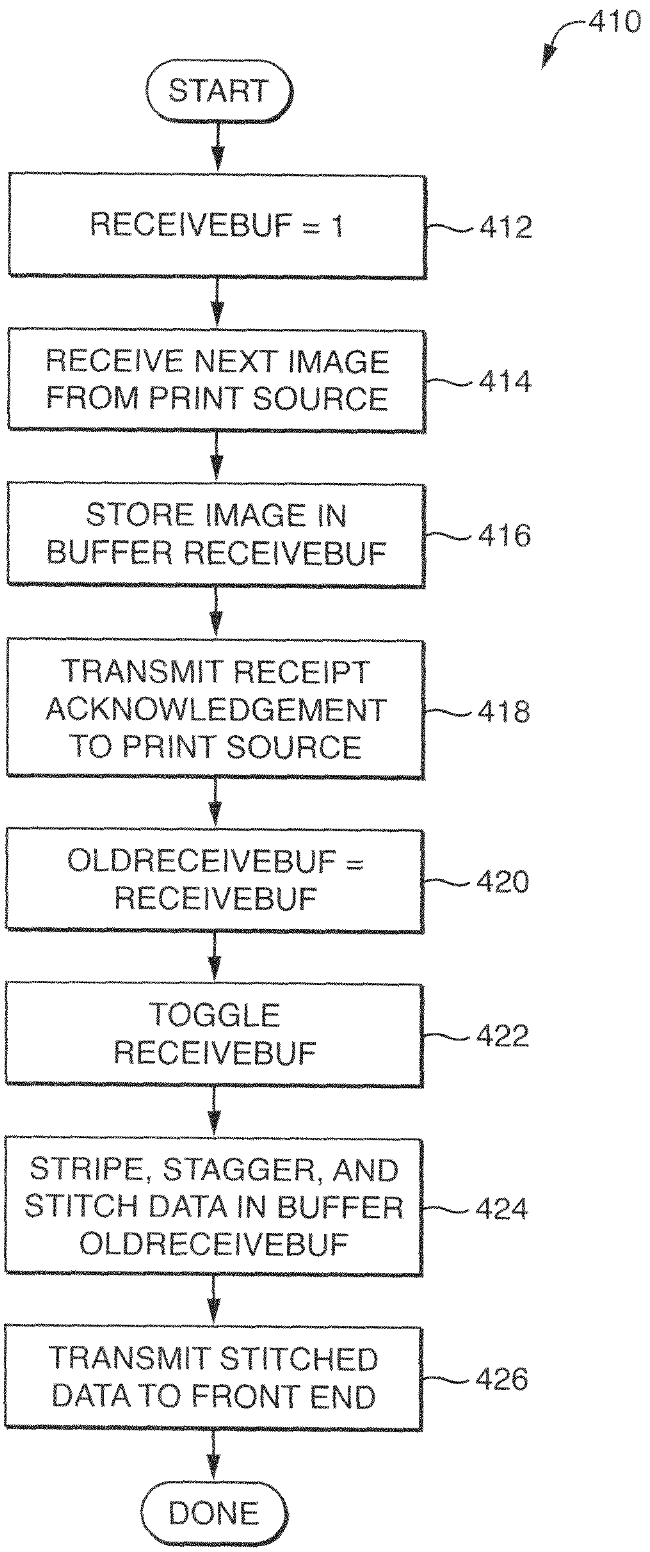
Figure 4C:
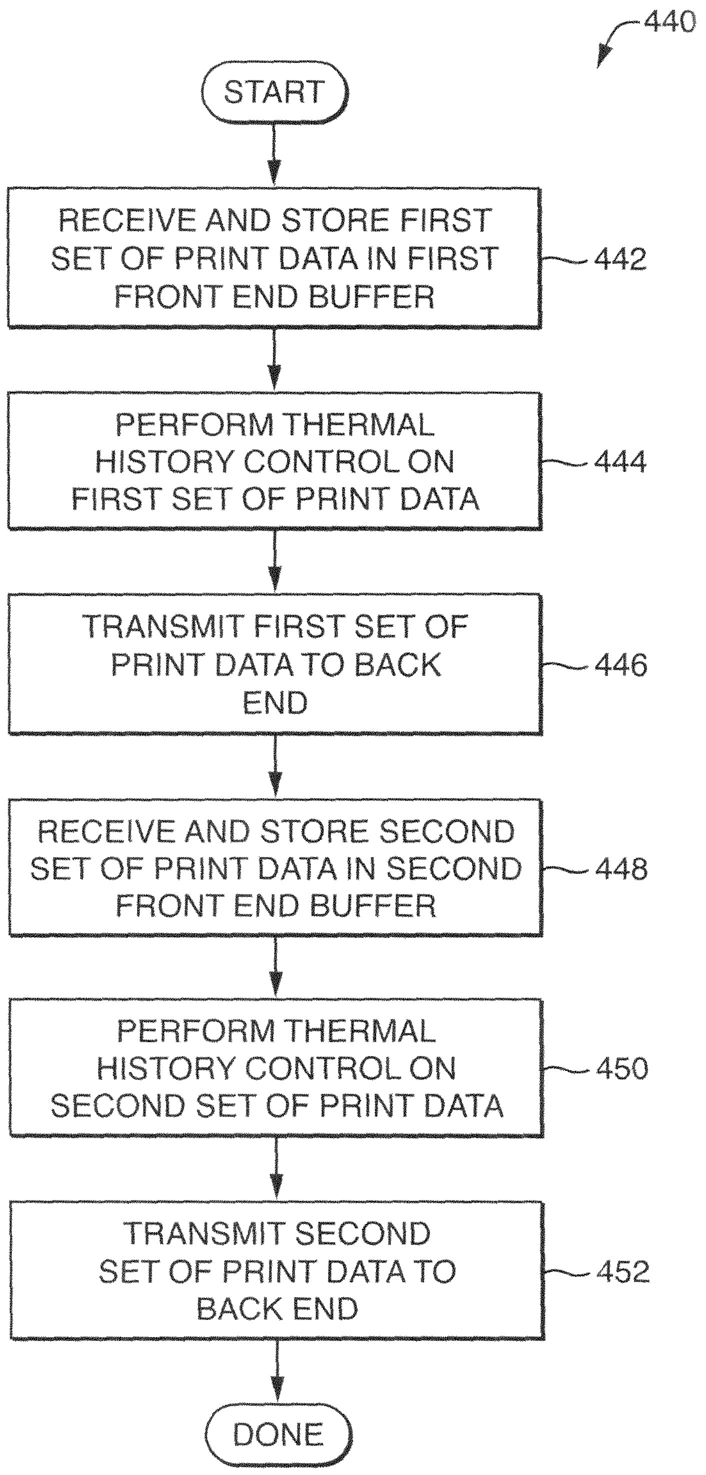
Figure 4D:
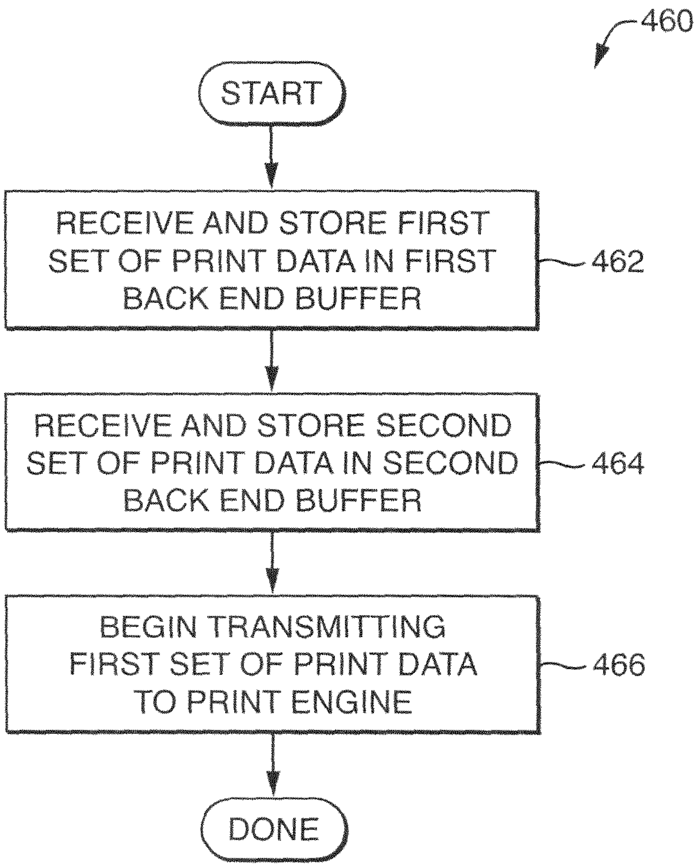
Figure 4E:
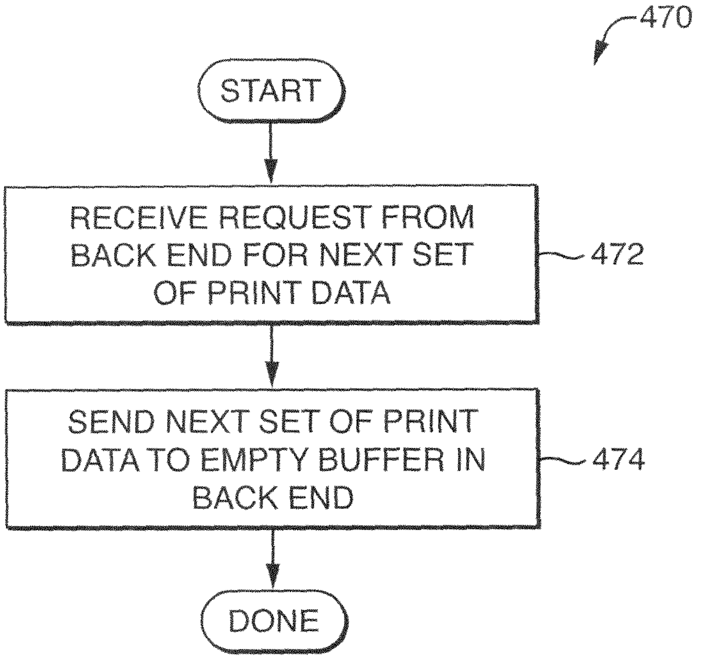
Figure 4F:
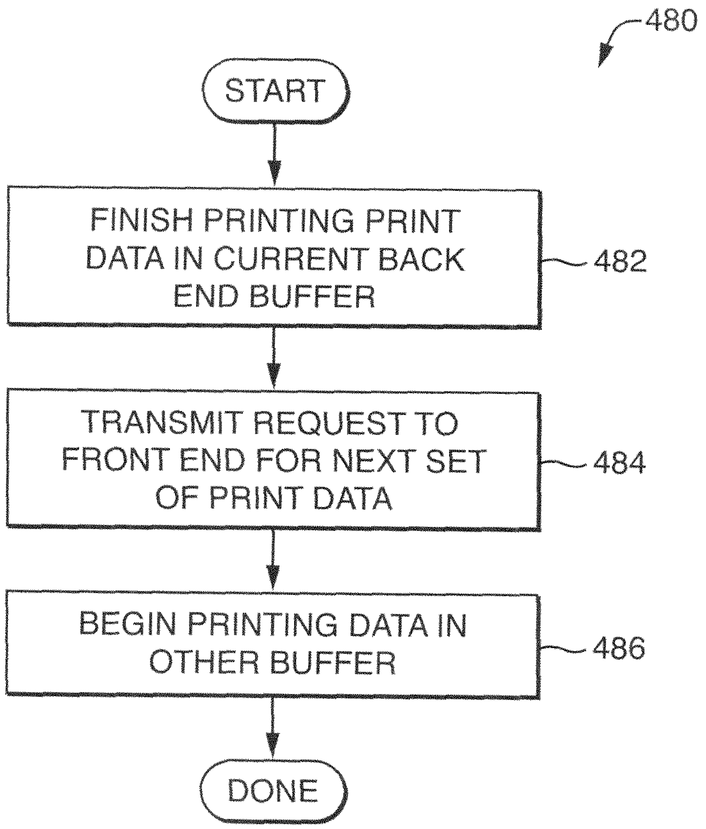
Figure 5:
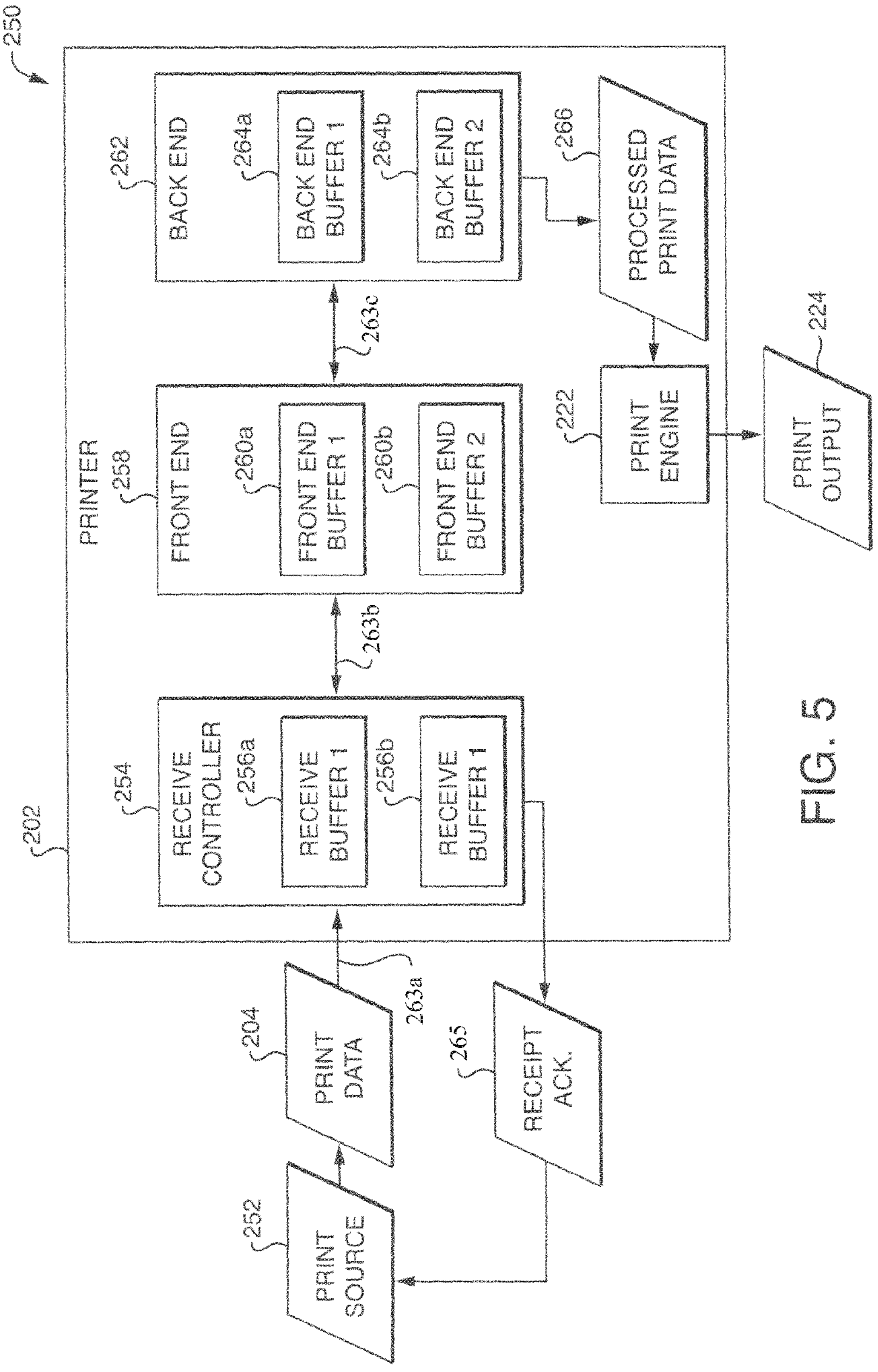
FIG. 5 illustrates the flow of print data through the printer of FIG. 2 according to one embodiment of the present invention.

Referring to FIG. 5, a functional block diagram is shown of a system 250 which includes the printer 202 of FIG. 2. While FIG. 2 illustrates the image processing steps that may be performed on the print data 204, FIG. 5 illustrates the flow of the print data 204 through the printer 202 in a manner intended to maximize the efficiency of printing according to one embodiment of the present invention. Referring to FIGS. 4A-4F, flowcharts are shown of methods that are used by the printer 202 to perform printing according to one embodiment of the present invention.

Referring to FIG. 5, the system 250 includes a print source 252 which provides the print data 204 to the printer 202. The print source 252 may be a personal computer, digital camera, scanner, or any other source of the print data 204. The printer 202 includes a receive controller 254, a front end 258, and a back end 262. Functions performed by the print source 252, receive controller 254, front end 258, and back end 262 will now be described with respect to FIGS. 4A-4F.

Referring to FIG. 4A, a flowchart is shown of a method 400 that is performed by the print source 252 to print a print job according to one embodiment of the present invention. Assume for purposes of the following discussion that the print job includes a plurality of digital images, although the print job may include any kind of print data. Each of the images may, for example, be a distinct page in a multi-page document. Alternatively, each of the images may be an image in a single-image document, such as a digital photograph, in which case the "print job" described below may include multiple distinct print jobs (one for each digital image) or a single print job which includes each of the images as a separate page. Various techniques for generating and formatting print jobs are well-known to those having ordinary skill in the art, and the particular examples just described do not constitute limitations of the present invention.

The print source 252 enters a loop over each image I in the plurality of images to print (step 402). The print source 252 transmits image I (in the form of print data 204) to the printer 202 (step 404). The print source 252 waits for an acknowledgement 265 from the printer 202 that the printer 202 has received the print data 204 (step 406). The print source 252 repeats steps 404-406 for the remaining images (step 408). As will be described in more detail below, the printer 202 may begin printing one or more of the images in the print job before the print source 252 has finished transmitting all of the images to the printer 202.

Referring to FIG. 4B, a flowchart is shown of a method 410 that is performed by the receive controller 254 according to one embodiment of the present invention. As shown in FIG. 5, the receive controller 254 includes a first receive buffer 256*a* and a second receive buffer 256*b*. In general, the receive controller 254 stores incoming print jobs in alternating ones of the receive buffers 256*a-b*. Referring to FIG. 4B, the receive controller 254 initializes a variable ReceiveBuf to a value of 1 (step 412), indicating that the next print job is to be stored in the first receive buffer 256*a*.

The receive controller 254 receives the next image (in the form of print data 204) from the print source 252 over connection 263*a* (step 414) and stores the image in the receive buffer indicated by the value of ReceiveBuf (step 416). In the present embodiment, ReceiveBuf=1 indicates receive buffer 256*a* and ReceiveBuf=2 indicates receive buffer 256*b*. The receive controller 254 transmits receipt acknowledgement 265 to the print source 252 (step 418).

The receive controller 254 initializes a variable OldReceiveBuf to be equal to the value of ReceiveBuf (step 420). The function performed by the variable OldReceiveBuf will be described in more detail below.

The receive controller 254 toggles the value of ReceiveBuf (step 422). In the present embodiment, step 422 may be implemented using the assignment ReceiveBuf=(3-ReceiveBuf). More generally, if there are more than two receive buffers, the value of ReceiveBuf may be cycled through its permissible range of values in a round robin fashion or other manner. As a result of toggling or otherwise changing the value of ReceiveBuf, the receive controller 254 will store the next received image in a different receive buffer than that indicated by the previous value of ReceiveBuf.

Note that the receive controller 254 may begin to receive the next image from the print source 252 after step 422, concurrently with execution of the remaining steps of method 410. When the receive controller 254 receives the next image from the print source 252, the receive controller 254 resumes execution of the method 410 beginning with step 414.

The method 410 stripes, staggers, and stitches the print data in the receive buffer indicated by the value of OldReceiveBuf and stores the stitched print data back in the receive buffer indicated by OldReceiveBuf (step 424). Step 424 may be performed by the receive controller 254 or other component of the printer 202, and may be performed, for example, using the techniques described above with respect to steps 104-108 of method 100. The receive controller 254 transmits the stitched print data to the front end 258 over bus 263*b* (step 426), where it is further processed as described below with respect to FIGS. 4C and 4E. Although step 426 is performed after an entire image is received from the print source 252, this is not a requirement of the present invention. The receive controller 254 may, for example, begin transmitting the stitched print data to the front end 258 before the entire image is received if the print source 252 is known or expected to be capable of providing data to the receive controller 254 as quickly as such data can be consumed by the printer 202.

Operation of the front end 258 and back end 262 will now be described according to one embodiment of the present invention. Note that the front end 258 includes two front end buffers 260*a-b* and that the back end 262 includes two back end buffers 264*a-b*. The receive controller 254, front end 258, and back end 262 may, for example, be software programs, and the receive buffers 256*a-b*, front end buffers 260*a-b*, and back end buffers 264*a-b* may, for example, be regions of memory (e.g., RAM) or a hard disk or other persistent storage medium. Although two receive buffers 256*a-b*, two front end buffers 260*a-b*, and two back end buffers 264*a-b* are shown in FIG. 5, the there may be any number of such buffers. In one embodiment of the present invention, the front end 258 and back end 262 are coupled over a high-speed link 264*c*, such as a PCI bus.

Referring to FIG. 4C, a flowchart is shown of a method 440 that is performed by the front end 258 at the beginning of a print job. In general, the front end 258 receives two buffers of print data from the receive controller 254, stores the data in the first and second front end buffers 260*a-b*, and transmits the data to the first and second back end buffers 264*a-b*, before the printer 202 begins printing.

More specifically, the frond end 258 receives a first set of print data from the receive controller 254 (transmitted in step 426, FIG. 4B) and stores the first set of print data in the first front end buffer 260*a* (step 442). In practice the front end 258 may receive print data from the receive controller 254 and continuously store it in the first front end buffer 260*a* until the buffer 260*a* is full.

The front end 258 or other component of the printer 202 performs thermal history control on the first set of print data (using, for example, the techniques described above with respect to step 110 in FIG. 1) (step 444) and transmits the resulting set of print data to the back end 262 (step 446), where it is stored in the first back end buffer 264*a*.

The front end 258 then processes the second set of print data from the receive controller 254 in the same way. More specifically, the front end receives the second set of print data from the receive controller 254 and stores it in the second front end buffer 260*b* (step 448). The front end 258 performs thermal history control on the second set of print data (step 450) and transmits the resulting processed print data to the back end 262 (step 452), where it is stored in the second back end buffer 264*b*.

Referring to FIG. 4D, a flowchart is shown of a method 460 that is performed by the back end 262 at the beginning of a print job, i.e., before the print engine 222 has begun printing. In general, the back end 258 receives the first two sets of print data from the front end 258, stores them in the back end buffers 264*a-b*, and then transmits them to the print engine 222 for printing.

More specifically, the back end 262 receives a first set of print data from the front end 258 (transmitted in step 446, FIG. 4C) and stores the first set of print data in the first back end buffer 264*a* (step 462). The back end 262 receives a second set of print data from the front end 258 and stores the second set of print data in the second back end buffer 264*b* (step 464). The back end 262 then begins transmitting the first set of processed print data 266 to the print engine 222 (step 466), which begins printing the processed print data 266.

Referring to FIGS. 4E-4F, flowcharts are shown of method 470 and 480 which are performed by the front end 258 and back end 262, respectively, after the initiation of printing (i.e., after performance of methods 440 and 460) according to one embodiment of the present invention. Method 480 will be described first.

As described above with respect to FIG. 4D, the back end 262 begins transmitting print data 266 to the print engine 222 for printing after the front end 258 has filled both buffers 264*a-b*. The back end 262 continues providing print data 266 from the first buffer 264*a* to the print engine 222. When the back end 262 finishes providing print data from the first back end buffer 264*a* to the print engine 222 (step 482), the first buffer 264*a* will be empty. Upon sensing that the first buffer 264*a* is empty, the back end 262 transmits a request (over bus 263*c*) to the front end 258 for the next set of print data to print (step 484). The back end 262 begins printing the set of print data stored in the other buffer 264*b* (step 486). Note that step 486 may be performed while the back end 262 is receiving the next set of print data from the front end 258. Although the method 480 is described with respect to printing from the first buffer 264*a*, the method 480 applies more generally to printing from either of the buffers 264*a-b*.

Referring to FIG. 4E, when the front end 258 receives a request from the back end 262 (transmitted in step 484) for the next set of print data (step 472), the front end 258 transmits the next set of print data (from the current one of the front end buffers 260*a-b*) to the back end 262 (step 474), where the set of print data is stored in the empty one of the back end buffers 264*a-b*. The front end 258 may toggle between the front end buffers 260*a-b* as the source of the next set of print data to transmit to the back end 262.

In summary, at the beginning of a print job, the receive controller 254 receives two buffers of print data, performs striping, staggering, and stitching on them, and transmits the print data to the front end 258, which stores the print data in front end buffers 260*a-b*. The front end 258 performs thermal history control on the print data and transmits the print data to the back end 262, where it is stored in the back end buffers 264*a-b*. Once both of the back end buffers 264*a-b* are full, the back end 262 begins transmitting processed print data 266 to the print engine 222, which begins printing the print data 266. When either of the back end buffers 264*a-b* has been emptied of data, the back end 262 transmits a request (e.g., interrupt) to the front end 258, in response to which the front end 258 transmits another buffer of data to the back end 262, where the data is stored in the empty back end buffer. Similarly, when one of the front end buffers 260*a-b* has been emptied of data, the front end 258 receives additional data from the receive controller 254 and stores it in the empty front end buffer.

The techniques described above with respect to FIGS. 4A-4F may therefore be used to perform image processing steps such as striping, staggering, stitching, and thermal history control on a print job in a manner which enables processed print data 266 to be provided efficiently to the print engine 222, so that such print data 266 may always be available for printing by the print engine 222 during execution of the print job. As a result, the print engine 222 may print the entire print job without stopping, thereby minimizing the total time required to print the print job.

Figure 6:
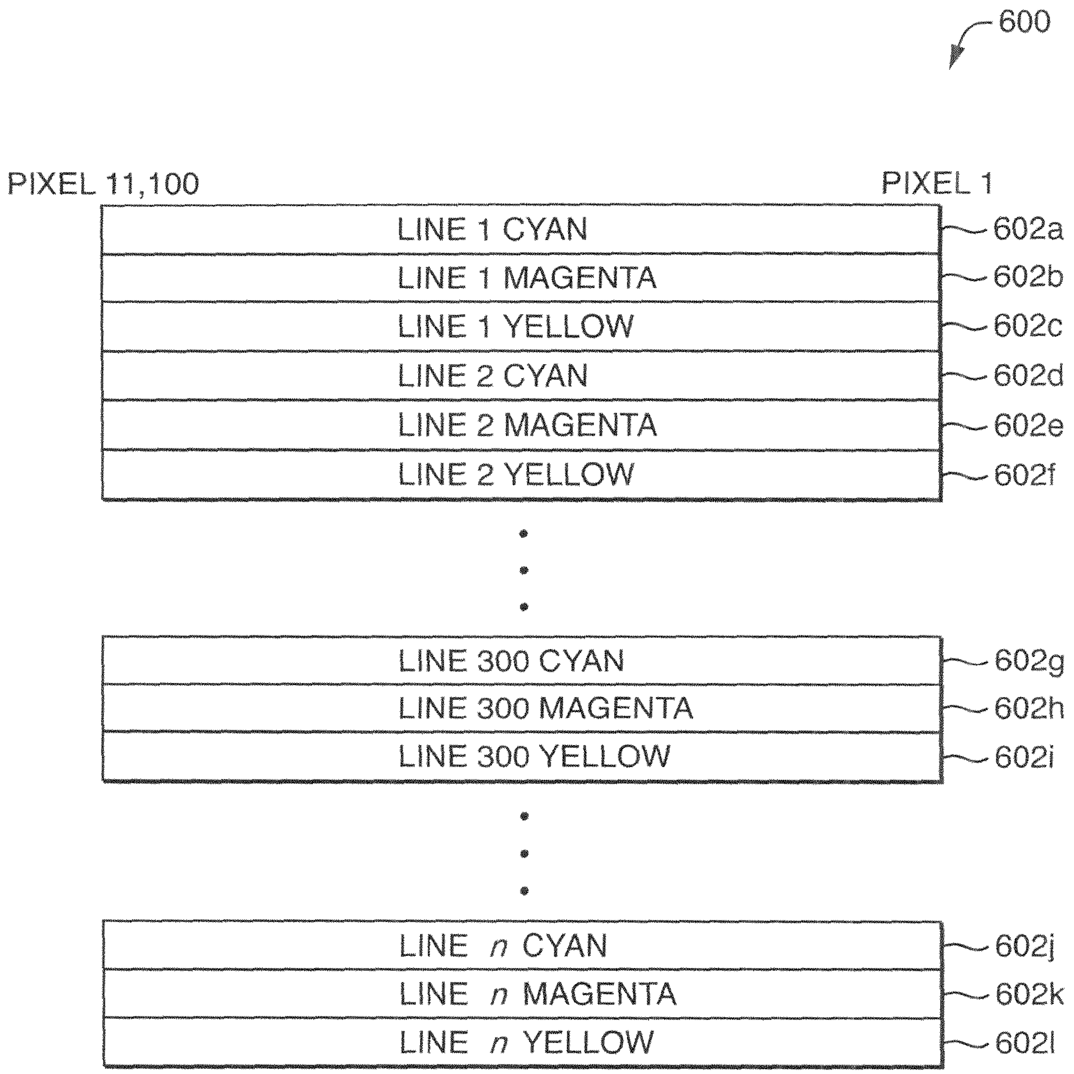
FIG. 6 is a diagram of a print data file as it may be stored on a disk or other medium according to one embodiment of the present invention.

Now referring to FIG. 6, a diagram is shown of a print data file 600 as it may be stored on a disk or other medium. Examples of data which may be represented in the format shown in FIG. 6 include the print data 204 that is transmitted to the printer 202 (FIG. 2) and the print data stored in the receive buffers 256*a-b*, front end buffers 260*a-b*, and back end buffers 264*a-b* (FIG. 5). In the following discussion it is assumed that the print data 204 are stored in the format shown in FIG. 6.

Print data are arranged in the print data file 600 in alternating lines of cyan, magenta, and yellow pixels. Although only a select number of lines 602*a*-1 are shown in FIG. 6, in practice the print data file 600 may include as many lines as are needed to represent all of the print data 204. Each of the lines 702*a*-1 represents a full line (i.e., row) of pixels in the cross-web direction 308*b* (FIG. 3). For example, if the output medium 302 of FIG. 3 were used, each of the lines 602*a*-1 would contain 11,100 pixels.

More specifically, line 602*a* contains the first line of cyan pixels in the print data 204, line 602*b* contains the first line of magenta pixels in the print data 204, and line 602*c* contains the first line of yellow pixels in the print data 204. Line 602*d* contains the second line of cyan pixels in the print data 204, line 602*e* contains the second line of magenta pixels in the print data 204, and line 602*f* contains the second line of yellow pixels in the print data 204.

Line 602*g* contains the 300th line of cyan pixels in the print data 204, line 602*h* contains the 300th line of magenta pixels in the print data 204, and line 602*i* contains the 300th line of yellow pixels in the print data 204. For ease of illustration, the intervening lines 2-299 of print data 204 are not shown in FIG. 6. Finally, line 602*j* contains the nth line of cyan pixels in the print data 204, line 602*k* contains the nth line of magenta pixels in the print data 204, and line 602*l* contains the nth line of yellow pixels in the print data 204, where n is the total number of lines in the print data 204. For ease of illustration, the intervening lines 301-($n$−1) of print data 204 are not shown in FIG. 6.

Figure 7A:
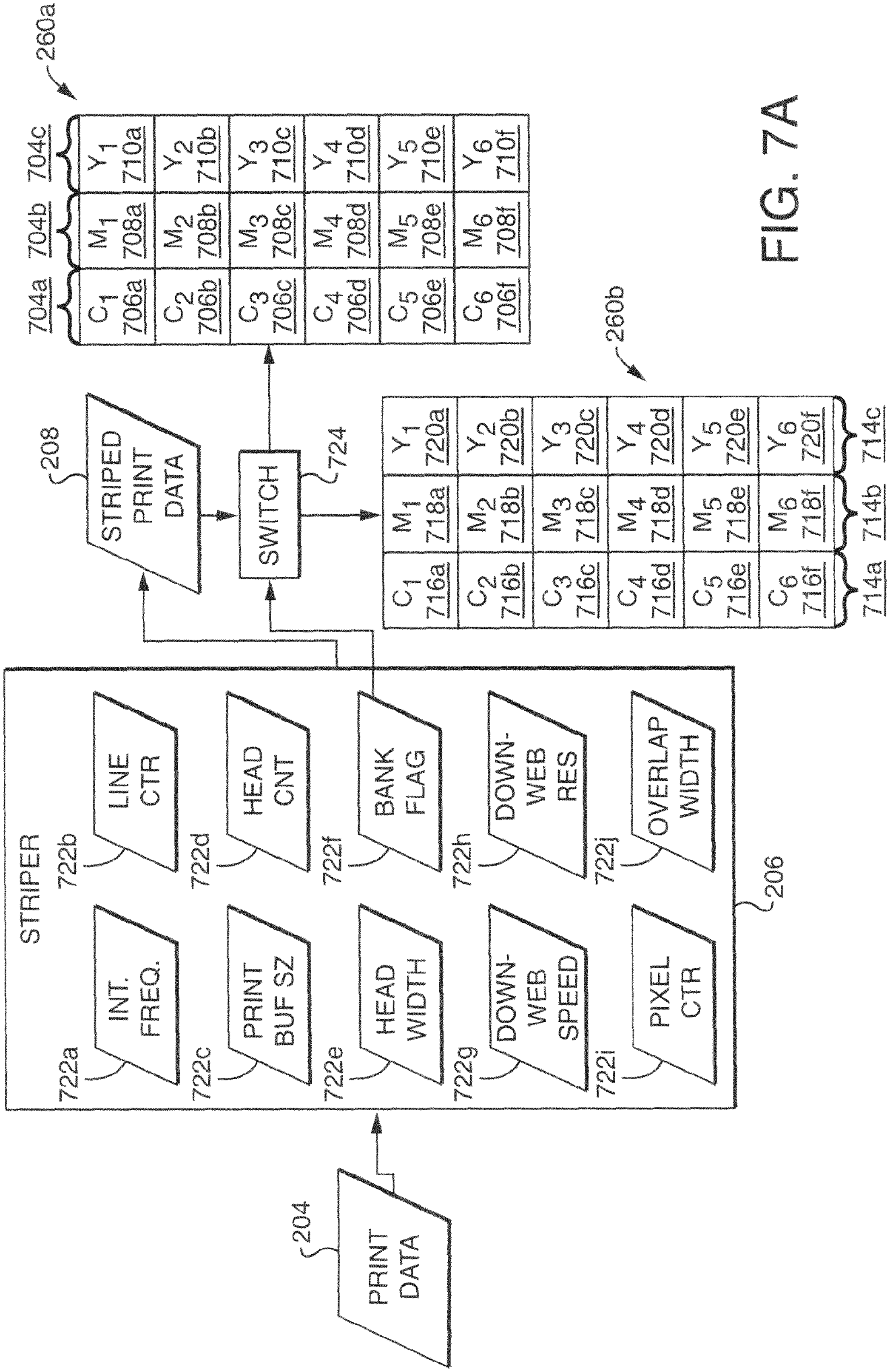
FIG. 7A is a diagram illustrating a system for performing striping on print data according to one embodiment of the present invention.

In one embodiment of the present invention, the front end buffers 260*a-b* and back end buffers 264*a-b* are subdivided into smaller buffers, each of which corresponds to one of the print heads 304*a-f* and 306*a-f*. For example, referring to FIG. 7A, a diagram is shown illustrating the front end buffers 260*a-b* according to one embodiment of the present invention. The first front end buffer 260*a* includes cyan print buffers 706*a-f*, magenta print buffers 708*a-f*, and yellow print buffers 710*a-f*. Similarly, the second front end buffer 260*b* includes cyan print buffers 716*a-f*, magenta print buffers 718*a-f*, and yellow print buffers 720*a-f*.

Each of the sub-buffers in buffers 260*a-b* stores print data for a particular one of the print heads 304*a-f* and 306*a-f*. For example, print buffer 706*a* stores print data (e.g. 752*a*-752*b*) to be printed by cyan print head 306*a*, print buffer 706*b* stores print data (e.g. 754*a*-754*b*) to be printed by cyan print head 306*b*, and so on (e.g. 756*a*-756*b* for print buffer 706*c*). Similarly, print buffers 708*a* and 710*a* store print data (e.g. 758*a*-758*b*, 764*a*-764*b*) to be printed by magenta/yellow print head 304*a*, print buffers 708*b* and 710*b* store print data (e.g. 760*a*-760*b*, 766*a*-766*b*) to be printed by magenta/yellow print head 304*b*, and so on (e.g. 768*a*-768*b* for print buffer 710*c*). The sub-buffers in the second front end buffer 260*b* are arranged in the same manner as the sub-buffers in the first front end buffer 260*a*. Furthermore, the sub-buffers (not shown) in the receive buffers 256*a-b* and the back end buffers 264*a-b* may also be arranged in the manner shown in FIG. 7A.

Figure 7B:
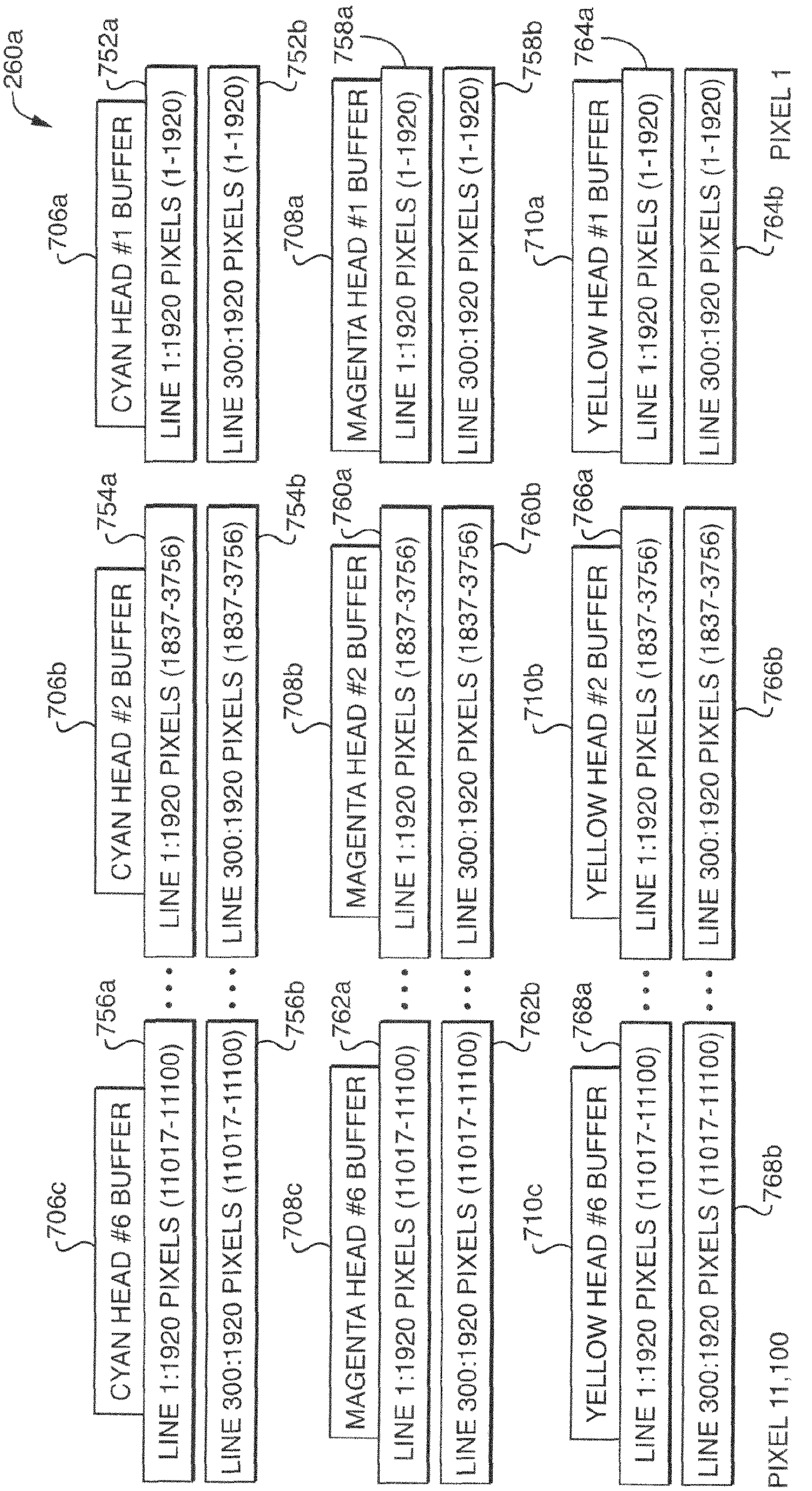
FIG. 7B is a diagram illustrating striped print data according to one embodiment of the present invention.

Before describing an example of a method that the striper 206 may use to perform striping on the print data 204, a particular example of striped data will be described. Referring to FIG. 7B, a diagram is shown of a particular example of the striped print data 208 as it may be stored by the striper 206 in the print buffers 260*a-b*. Data in the back end print buffers 264*a-b* may be stored in the same arrangement as that illustrated in FIG. 7B. The following explanation of the arrangement of striped data illustrated in FIG. 7B will facilitate explanation of techniques that may be used by the striper 206 to generate the striped print data 208.

In the example shown in FIG. 7B, 300 lines of cyan print data are stored in cyan print buffers 706*a-f*, although only buffers 706*a*, 706*b*, and 706*f* are shown for ease of illustration. The cyan print data are divided in the cross-web direction among buffers 706*a-f* as follows. Cyan print buffer 706*a* includes pixels 1-1920 of each of the 300 lines of cyan print data. For example, the first line 752*a* of buffer 706*a* includes pixels 1-1920 of the first line of cyan print data, and the last ($300^{th}$) line 752*b* of buffer 706*a* includes pixels 1-1920 of the $300^{th}$ line of cyan print data.

Cyan print buffer 706*b* includes pixels 1837-3756 of each of the 300 lines of cyan print data. For example, the first line 754*a* of buffer 706*b* includes pixels 1837-3756 of the first line of cyan print data, and the last ($300^{th}$) line 754*b* of buffer 706*b* includes pixels 1837-3756 of the $300^{th}$ line of cyan print data. Finally, the first line 756*a* of cyan print buffer 706*f* includes pixels 11,017-11,100 of the first line of cyan print data, and the ($300^{th}$) line 756*b* of buffer 706*f* includes pixels 11,017-11,1000 of the $300^{th}$ line of cyan print data.

Note that there is an overlap of 84 pixels between buffer 706*a* and buffer 706*b*. More specifically, both buffers 706*a-b* contain pixels 1837-1920 of each of the 300 lines of cyan print data. This overlap represents the 84-pixel overlap region 310 between cyan print head 306*a* and cyan print head 306*b* (FIG. 3). Although not shown in FIG. 7B, buffers 706*b-f* have similar overlaps of duplicated print data. The data 758*a-b*, 760*a-b*, 762*a-b* stored in magenta print buffers 708*a-f* and data 764*a*-764*b*, 766*a*-766*b*, 768*a*-768*b* store in yellow print buffers 710*a-f* is arranged in the same manner as just described with respect to cyan print buffers 706*a-f*.

Figure 8:
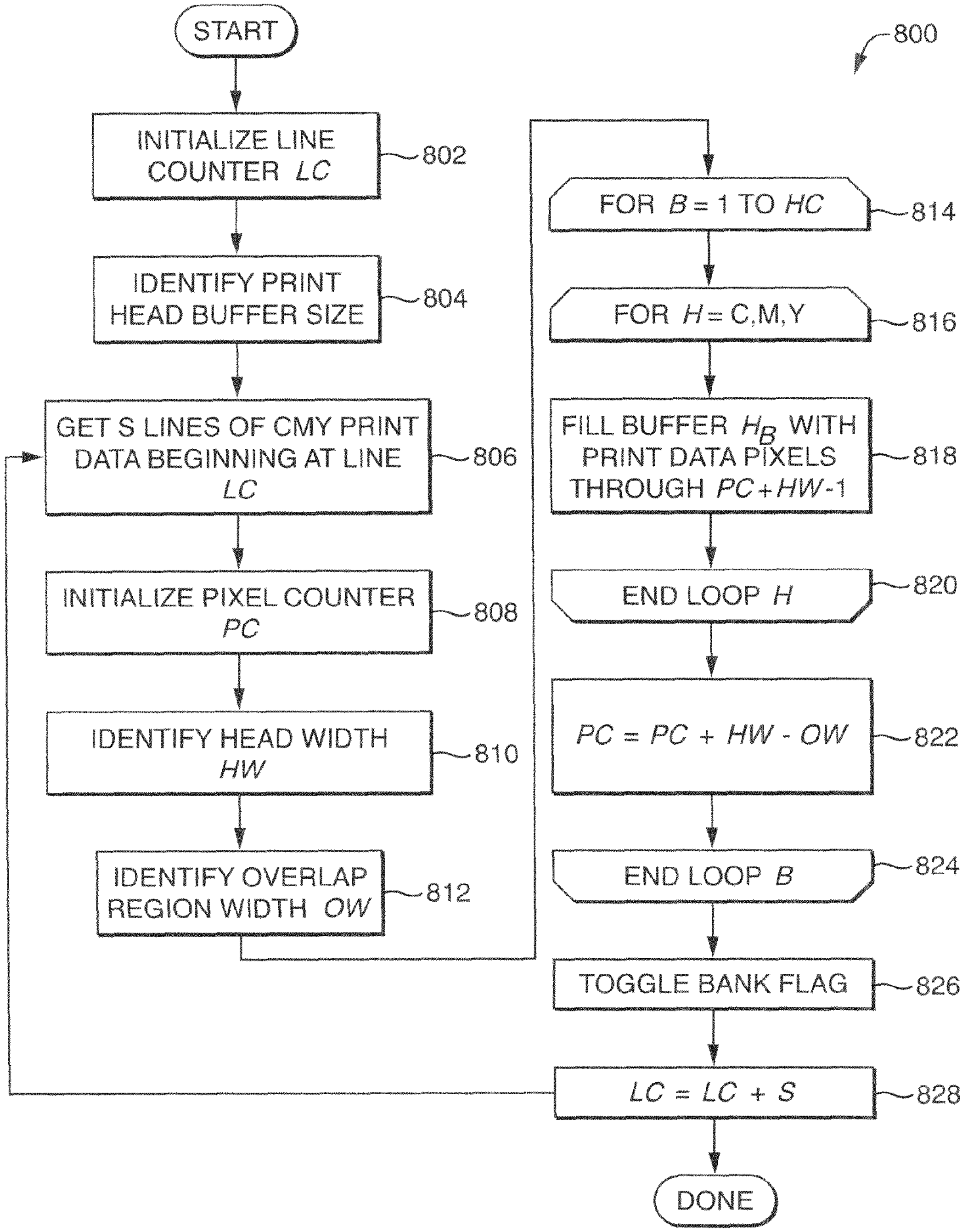
FIG. 8 is a flowchart of a method that is used to perform striping on print data according to one embodiment of the present invention.

As described above with respect to FIGS. 1-2, the striper 206 may performing striping on print data 204 to produce striped print data 208. In general, the striper 206: (1) divides the print data 204 into vertical stripes (i.e., columns) of data, each of which is suitable for printing by one of the plurality of print heads 304*a-f* and 306*a-f*, and (2) stores the striped data in front end print buffers 260*a-b* in the arrangement illustrated in FIG. 7B. Referring to FIG. 8, a flowchart is shown of a method 800 that is performed by the striper 206 in one embodiment of the present invention to stripe the print data 204 and thereby to produce the striped print data 208 (FIG. 1, step 104). The following description of the method 800 also makes reference to FIG. 7A, which illustrates the striping of print data 204 by striper 206.

The method 800 initializes the value LC of a line counter 722*b* to an initial value (e.g., 1) (step 802). The line counter 722*b* specifies the line number of the first line of print data 204 that should be stored in the print buffers 260*a-b*. The method 800 identifies the size 722*c* (in lines) of each print head buffer (step 804). The term "print head buffer" refers to a buffer associated with an individual print head. For example, each of the buffers 706*a-f* is a print head buffer.

The interrupt frequency 722*a* is the frequency at which the back end 262 interrupts the front end 258 to request additional print data. The value of the size 722*c* may be selected to be large enough to hold at least as many lines of print data as may be printed by the print engine 222 between such interrupts. The value of the size 722*c* may be selected prior to initiation of the method 800 based on the down-web speed 722*g* of the output medium 302, the down-web resolution 722*h* of the print heads 304*a-f* and 306*a-f*, and the interrupt frequency 722*a*.

In the present example, the down-web speed 722*g* of the output medium 302 is 0.5 inch/sec and the down-web resolution 722*h* of the print heads 304*a-f* and 306*a-f* is 300 dpi. Assume that the interrupt frequency 722*a* is one interrupt every two seconds. The output medium 302 travels 1.0 inches between each pair of interrupts (0.5 inch/sec×2.0 seconds). During this time, 300 lines are printed (300 dpi×1.0 inches). Therefore, the print buffer size 722*c* should be at least 300 lines if the print buffers 702*a-b* are to hold sufficient print data to enable the print heads 304*a-f* and 306*a-f* to print continuously between interrupts. As described above, in the present example, the print buffer size 722*c* is equal to 300 lines. Once the print buffer size 722*c* is calculated, the method 800 may therefore identify the print buffer size 722*c* in step 804 as the number of lines printed between interrupts.

Letting S be the print buffer size 722*c*, the method 800 selects S lines of cyan, magenta, and yellow print data (for a total of 3s lines) beginning at the line number LC specified by the line counter 722*b* (step 806). For example, if LC=1, then the method 800 would obtain lines 1-300 of the print data 204 in step 806.

The method 800 initializes a pixel counter PC 722*i* to a value such as one (step 808). The method 800 identifies the width HW 722*e* of each of the print heads 304*a-f* and 306*a-f* (step 810), and the width OW 722*j* (in pixels) of the overlap region 310 (step 812).

Let HC be the number of heads 722*d* of each color. In the present example, HC=6. The method 800 enters a loop over a variable B (buffer) beginning with a value of 1 and ending with a value of HC (step 814). As will now be described in more detail, in each iteration of the loop over B, the buffers for a distinct one of the columns 318*a-f* is filled with striped print data.

The method 800 enters a loop over a variable H (head), which may take on values representing cyan, magenta, and yellow (step 816). The method 800 identifies the buffer $H_B$ specified by the values of H and B. For example, if H=1 and B=1, then $H_B$ is buffer 706*a*. If H=3 and B=3, then $H_B$ is buffer 710*c*. If buffer 260*a* is viewed as a two-dimensional array, then H and B may be viewed as indices into a two-dimensional array to identify the corresponding buffer.

The method 800 fills buffer $H_E$ with print data of color H, beginning at pixel PC and ending at pixel PC+HW−1 (step 818). For example, if H=1, B=1, PC=1 and HW=1920, then buffer 706*a* may be filled with pixels 1-1920 of the cyan print data obtained in step 806. Similarly, if H=2, B=3, PC=1837, and HW=1920, then buffer 708*c* may be filled with pixels 1837-3756 of the magenta print data obtained in step 806. The method 800 repeats step 818 for the remaining values of H (step 820).

Upon completion of the loop in steps 816-820, the method 800 will have filled one set of cyan, magenta, and yellow print head buffers. For example, the first time the loop in steps 816-820 is performed (i.e., when B=1 and PC=1), the method 800 will fill buffers 706*a*, 708*a*, and 710*a* with pixels 1-1920 of cyan, magenta, and yellow print data, respectively.

The method 800 assigns a new value to the pixel counter PC using the formula PC=PC+HW−OW (step 822). In other words, the method 800 increases the value of the pixel counter 722*i* by the width 722*e* of a print head minus the width 722*j* of the overlap region 310. For example, if PC=1, then step 824 will assign the value 1837 (1+1920−84) to PC. Such a result comports with the pixel number of the pixels on the left edge of buffers 706*b*, 708*b*, and 710*b* in FIG. 7B.

The method 800 increments the value of B (step 824) and repeats steps 816-822 if B is not greater than HC. The method 800 thereby fills the next column of print head buffers. It should be appreciated that the remainder of the loop over B fills the remaining columns of print head buffers with print data in the manner illustrated in FIG. 7B.

As described above, the striper 206 may store striped print data alternatively in the first and second print buffers 260*a-b*. A bank flag 722*f* may store a binary value that indicates in which of the two banks 260*a-b* the striper 206 is to store striped print data 206 at any particular point in time. For example, the bank flag 722*f* may be coupled to a switch 724 which directs the output 208 of the striper 206 to the first bank 260*a* when the bank flag 722*f* is equal to zero, and which directs the output 208 of the striper 206 to the second bank 260*b* when the bank flag 722*f* is equal to one.

After the striper 206 stores striped data 208 in one of the banks 260*a-b* (by performing steps 806-824), the method 800 may toggle the value of the bank flag 722*f* (step 826). The method 800 may then increase the value of the line counter 522*b* by the value of S (step 828) and return to step 806. Although not shown in FIG. 8, the method 800 may not perform step 806 again until the next interrupt is received from the back end 262, as described above with respect to step 472 of method 470 (FIG. 4E).

Assume, for example, that the striper 206 stores striped print data 208 in print buffer 260*a* on one pass of steps 806-824. When the bank flag 722*f* is toggled (step 826) and steps 806-824 are next performed, the next set of S lines from the print data 204 will be striped and stored by the striper 206 in print buffer bank 260*b*. During the next pass of steps 806-826, the striper 206 will store striped print data in buffer 260*a*. In this way, the striper 206 alternatively stores striped print data 206 in buffers 260*a* and 260*b*.

The use of two buffer banks 260*a-b* enables a new set of S lines of striped data 208 to be stored in one of the buffers 260*a-b* while additional processing or printing is being performed on the striped print data in the other one of the buffers 260*a-b*. As a result, a new set of striped data may always be available for printing immediately after the previous set of striped data has finished printing. In this way, the print heads 304*a-f* and 306*a-f* may be provided with data continuously, thereby enabling the printer 202 to print data at maximum efficiency.

Although FIGS. 7B and 8 were described above with respect to the operation of the striper 206, those having ordinary skill in the art will appreciate how to apply similar techniques to the operation of the staggerer 210, the stitcher 214, and the thermal history control engine 218 to process and print the print data 204 with a high degree of efficiency.

As described above, staggerer 210 staggers the striped print data 208 to produce staggered print data 212. The term "staggering" refers to the process of providing data to the print heads 304*a-f* and 306*a-f* in a sequence that takes into account the physical staggering of the print heads 304*a-f* and 306*a-f* in the down-web direction 308*a* and which thereby provides the correct print data to the print heads 304*a-f* and 306*a-f* at the correct times. Performing staggering correctly also requires that the down-web print speed and down-web resolution be taken into account.

The need for staggering may be appreciated by reference to FIG. 3. Consider, for example, the printing of a single line of print data by magenta/yellow print heads 304*a-f*. It may be seen from FIG. 3 that the output medium 302 will first pass simultaneously under magenta/yellow print heads 304*a*, 304*c*, and 304*e*, and then pass (8.0 seconds later in the present example) simultaneously under magenta/yellow print heads 304*b*, 304*d*, and 304*f*. If the entire line of pixels to be printed were provided simultaneously to all six magenta/yellow prints heads 304*a-f*, the line of pixels would be printed in discontinuous segments on the output medium 302 due to the physical staggering of print heads 304*a-f* in two distinct rows 316*a* and 316*c*. Therefore it is necessary to stagger the print data that is provided to print heads 304*a-f* over time in such a manner that the resulting line of pixels is in fact printed in a single line on the output medium 302.

Figure 9:
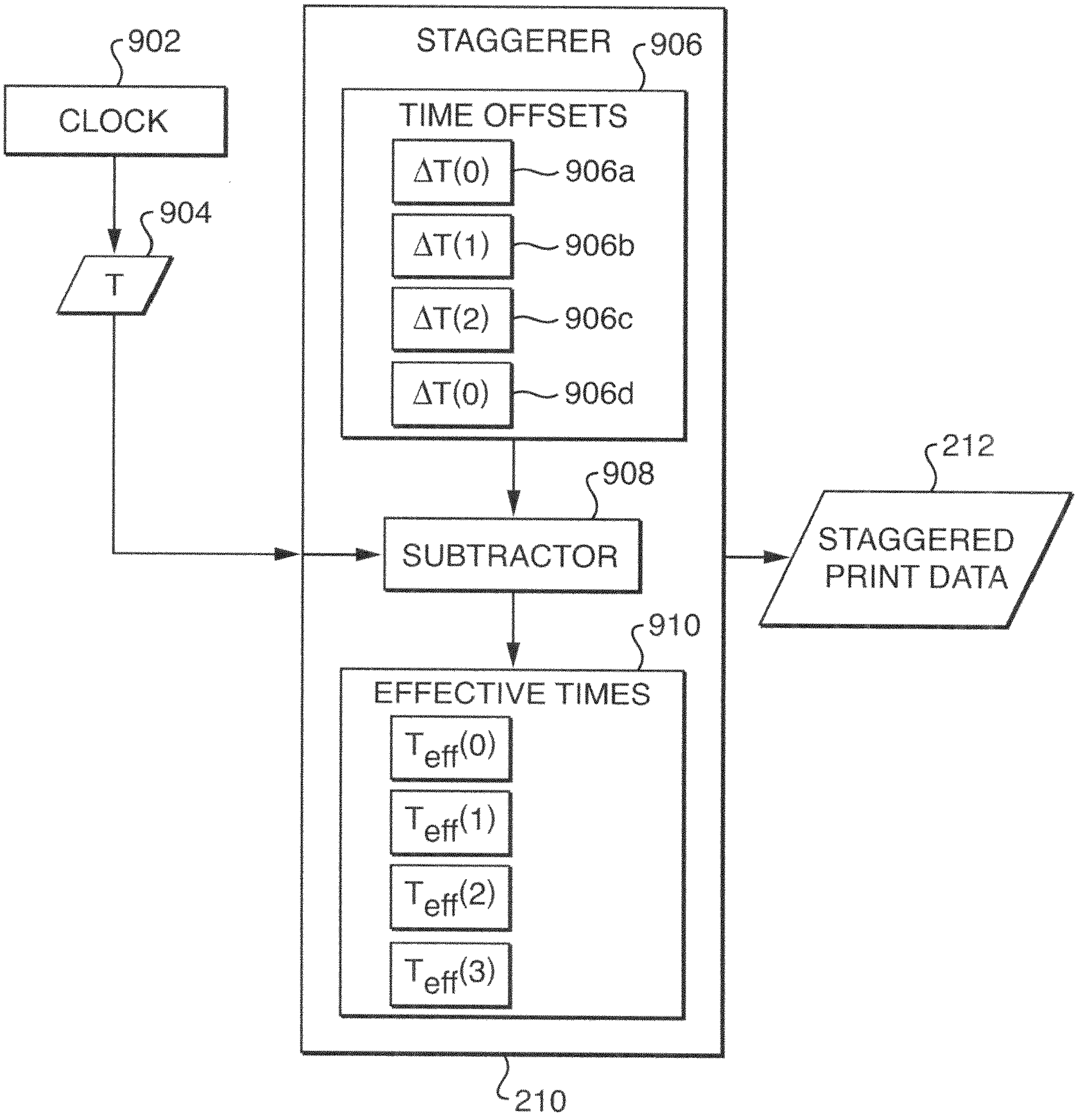
FIG. 9 is a functional block diagram illustrating techniques for performing staggering on print data according to one embodiment of the present invention.
Figure 10:
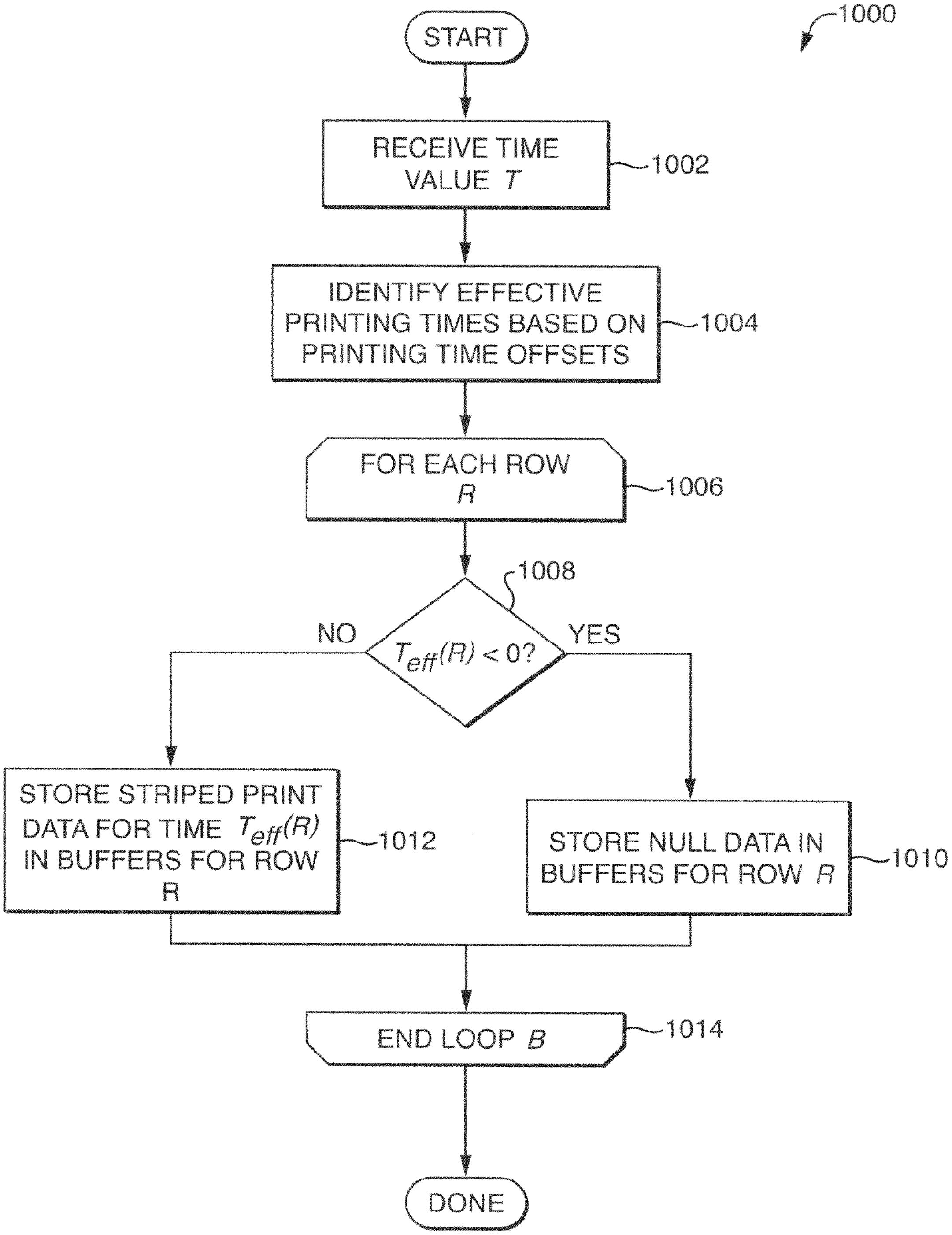
FIG. 10 is a flowchart of a method for performing staggering on print data according to one embodiment of the present invention.

Referring to FIG. 9, a functional block diagram is shown which illustrates the operation of the staggerer 210 in more detail according to one embodiment of the present invention. Referring to FIG. 10, a flowchart is shown of a method 1000 for performing staggering according to one embodiment of the present invention. The method 1000 may, for example, be used by the staggerer 210 to stagger the striped print data 208 and thereby to produce staggered print data 212 (FIG. 1, step 106).

Referring to FIG. 9, a clock 902 outputs a time signal T 904. The clock 902 may, for example, update the time signal T 904 at intervals equal to the period of a print head cycle. The staggerer 110 includes a set of time offsets 906 which indicates the amount of time by which the output produced by each of the print head rows 316*a-d* (FIG. 3) is offset from the time at which the first row 316*a* produces output. Let R be a row number, where R=0 for row 316*a*, R=1 for row 316*b*, R=2 for row 316*c*, and R=3 for row 316*d*. Let ΔT(R) be the time offset for row R. For example, using the relative timings illustrated in FIG. 3, ΔT(0)=0 seconds, ΔT(1)=2 seconds, ΔT(2)=8 seconds, and ΔT(3)=10 seconds. ΔT(0) will always be equal to zero, since each value of ΔT(R) is relative to the value of ΔT(0).

The method 1000 receives the current value of T 904 (step 1002). The staggerer 210 includes subtractor 908 which subtracts the time signal T 904 from the time offsets ΔT(R) 906*a-d* to produce effective times $T_{eff}$(R) 910 for each of the rows 316*a-d* (step 1004). For example, using the values of the time offsets 806*a-d* described above, when T=0, $T_{eff}$(0)=0, $T_{eff}$(1)=2, $T_{eff}$(2)=8, and $T_{eff}$(3)=−10.

The method 1000 enters a loop over each value of R (e.g., the values 0, 1, 2, and 3) (step 1006). The method 1000 determines whether $T_{eff}$(R)<0 for the current value of R (step 1008). If $T_{eff}$(R)<0, the method 1000 stores null data (e.g., zero values) in the buffers for row R (step 1010). Otherwise, the method 1000 stores the striped data 208 for time $T_{eff}$(R) in the buffers for row R (step 1012). The striped data 208 for a print head in row R at time $T_{eff}$(R) may, for example, be the striped print data 208 beginning at line number $T_{eff}$(R) times the down-web resolution of the print head times the down-web speed of the output medium 302.

The operation of steps 1008-1012 will now be described in more detail with respect to particular examples. Consider, for example, the beginning of a print job, in which case T=0 seconds. Now consider row 316*a*, for which R=0 and ΔT(0)=0 seconds. In this case, $T_{eff}$(0)=T−ΔT(0) 0−0=0. Therefore, in this case, the method 1000 would determine in step 1008 that $T_{eff}$(0) is not less than zero, and therefore would store striped print data for time $T_{eff}$(0) (e.g., 0 seconds) in the print buffers for magenta/yellow print heads 304*a*, 304*c*, and 304*e*. Such striped print data would begin at line zero of the striped print data 208. This is the correct result, since at the beginning of printing the output medium 302 would begin passing under the print heads 304*a*, 304*c*, and 304*e* in row 316*a*.

Now consider row 316*b*, for which R=1 and ΔT(0)=2 seconds, at the beginning of the same print job (T=0 seconds). In this case, $T_{eff}$(1)=T−ΔT(0)=0−2=−2. Therefore, in this case, the method 1000 would determine in step 1008 that $T_{eff}$(1) is less than zero, and therefore would store null print data in the print buffers for cyan print heads 306*a*, 306*c*, and 306*e*. This is the correct result, since at the beginning of printing the output medium 302 would not yet be passing under the print heads 306*a*, 306*c*, and 306*e* in row 316*b*. The same result would obtain for the print heads in rows 316*c* and 316*d* at time T=0.

Now consider the time at two seconds into the print job, at which T=0 seconds. Now consider row 316*a*, for which R=0 and ΔT(0)=0 seconds. In this case, $T_{eff}$(0)=T−ΔT(0)=2−0=2. Therefore, in this case, the method 1000 would determine in step 1008 that $T_{eff}$(0) is not less than zero, and therefore would store striped print data for time $T_{eff}$(0) (e.g., 2 seconds) in the print buffers for magenta/yellow print heads 304*a*, 304*c*, and 304*e*. Such striped print data would begin at line 300 of the striped print data 208.

Now consider row 316*b*, for which R=1 and ΔT(0)=2 seconds. When T=2, $T_{eff}$(1)=T−ΔT(0)=2−2=0. In this case, the method 1000 would determine in step 1008 that $T_{eff}$(1) is not less than zero, and therefore would store striped ed print data for time $T_{eff}$(1) (e.g., 0 seconds) in the print buffers for cyan print heads 306*a*, 306*c*, and 306*e*. Such striped print data would begin at line 0 of the striped print data 208. This is the correct result, since at time T=0, the beginning of the region printed by row 316*a* would just begin to pass under row 316*b*. At time T=0, the method 1000 would continue to store null data in the print buffers for rows 316*c-d*.

Now consider the time at eight seconds into the print job, at which T=8 seconds. Consider row 316*a*, for which R=0 and ΔT(0)=0 seconds. In this case, $T_{eff}$(0)=T−ΔT(0)=8−0=8. Therefore, in this case, the method 1000 would determine in step 1008 that $T_{eff}$(0) is not less than zero, and therefore would store striped print data for time $T_{eff}$(0) (e.g., 8 seconds) in the print buffers for magenta/yellow print heads 304*a*, 304*c*, and 304*e*. Such striped print data would begin at line 1200 of the striped print data 208.

Now consider row 316*b*, for which R=1 and ΔT(1)=2 seconds. When T=8, $T_{eff}$(1)=T−ΔT(1)=8−2=6. In this case, the method 1000 would determine in step 1008 that $T_{eff}$(1) is not less than zero, and therefore would store striped print data for time $T_{eff}$(1) (e.g., 6 seconds) in the print buffers for cyan print heads 306*a*, 306*c*, and 306*e*. Such striped print data would begin at line 900 of the striped print data 208.

Now consider row 316*c*, for which R=2 and ΔT(2)=8 seconds. When T=8, $T_{eff}$(2)=T−ΔT(2)=8−8=0. In this case, the method 900 would determine in step 1008 that $T_{eff}$(2) is not less than zero, and therefore would store striped print data for time $T_{eff}$(2) (e.g., 0 seconds) in the print buffers for cyan print heads 306*a*, 306*c*, and 306*e*. Such striped print data would begin at line 0 of the striped print data 208. This is the correct result, since at time T=8, the beginning of the region printed by row 316*a* would just begin to pass under row 316*c*. At time T=8, the method 1000 would continue to store null data in the print buffers for row 316*d*.

Although additional examples could be provided, the operation of steps 1008-1012 should be clear from the description above. Although the time signal T 904 may be incremented for every line of striped print data 208, it may be incremented in larger steps, in which case the number of lines of print data stored in the print buffers in steps 1010-1012 may be equal to the number of lines printed between updates of T. For example, if T is updated every 1.0 seconds, then steps 1010-1012 may each store 150 lines of print data (0.5 inch/sec*1.0 seconds*300 dots/inch), beginning at the line of print data corresponding to time $T_{eff}$(R).

The method 1000 repeats steps 1008-1012 for the remaining values of R (step 1014), thereby filling the buffers for the remaining rows 316*b-d* either with subsets of the striped print data 208 or with null data. The method 1000 repeats steps 1004-1014 when it receive the next time signal T 904 from the clock 902.

Among the advantages of the invention are one or more of the following. One advantage of techniques disclosed herein is that they enabling image processing steps such as striping and staggering to be performed efficiently by organizing data in buffers having buffer sizes and associated interrupt frequencies selected to ensure that print data is provided continuously to the print heads in a multi-head printer. The architecture of such a printer is both modular and scalable and is therefore suitable for use with subsequent generations of printers as they increase in speed.

Furthermore, techniques disclosed above can be implemented to provide print data at a sufficient speed using a conventional off-the-shelf operation system such as the Linux operating system, rather than a real-time operating system (RTOS). Although RTOSs typically provide higher bandwidth guarantees than conventional off-the-shelf operating systems, they are also more expensive, often by an order of magnitude. As a result, the ability to process print data at a sufficient speed using a conventional off-the-shelf operating system enables printers to be manufactured at much lower cost than with be possible with a RTOS.

More generally, the techniques disclosed herein may be employed to enable high-speed printing without the use of a real-time operating system and while keeping the amount of RAM needed in the printer to a minimum, thereby reducing the manufacturing cost of the printer even further. For example, assume a case in which the shortest time between interrupts for a non-real-time operating system is 700 milliseconds. In such a case, the minimum print buffer size is 105 lines (0.7*300*0.5, using the example figures described above). The total amount of RAM needed to implement buffers having this size may easily be calculated. Known amounts of additional RAM may be required for printer-resident software and other buffers. The minimum amount of RAM required to satisfy the minimum print buffer size required may therefore be calculated, allowing a printer which is capable of printing at maximum throughput to be manufactured at the minimum cost.

Another advantage of techniques disclosed above is that the print quality may be improved by providing some data, whether it be actual print data or null data (FIG. 10), to the print heads at all times during printing. For example, the thermal history control engine 218 may operate optimally within a range of temperatures and may not perform well when used to produce data that is provided to "cold" print heads (i.e., print heads whose temperature is below the lower limit of the temperature range for which the thermal history control engine 218 is optimized). In such a case, the print heads may be provided with preheat data, rather than null data, in step 1010 (FIG. 10) without requiring any other changes to the method 1000. The print heads may thereby be preheated so that the output of the thermal history control engine 218 is improved. Such techniques may, for example, be combined with the use of null data. For example, null data may be provided to a print head if the print head is already warm (e.g., from a previous print job), while preheat data may be provided to the print head if the print head is cold.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although various embodiments of the present invention are described with relation to thermal printers, the techniques disclosed herein are not limited to use in conjunction with thermal printers. Rather, the techniques disclosed herein may be used in conjunction with any kind of printer. Furthermore, the techniques disclosed herein are not limited to use in conjunction with printers having other particular features of the particular examples disclosed, such as the number, color, resolution, or speed of print heads.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for printing print data using a thermal printer including a plurality of staggered thermal print heads, the method comprising steps of:

(A) identifying one of the plurality of staggered thermal print heads as a reference thermal print head;

(B) identifying a plurality of time offsets corresponding to the plurality of staggered thermal print heads, the plurality of time offsets representing printing times of the plurality of staggered thermal print heads relative to the printing time of the reference thermal print head;

(C) for each of a plurality of printing times, performing steps of:

(1) for each of the plurality of staggered thermal print heads, determining whether to print a subset of the print data based on the time offset corresponding to the thermal print head;

(2) providing the subset of the print data to the thermal print head if it is determined that the thermal print head should print the subset of the print data; and (3) otherwise, storing the subset of the print data in a buffer for the thermal print head for printing by the thermal print head at a later printing time of the plurality of printing times, and providing a preheat data set to the thermal print head, responsive to the thermal print head having a temperature below the lower limit of a redetermined range.

2. The method of claim 1, wherein step (C) further comprises providing, to the thermal print head provided with the predetermined data set, the subset of the print data stored in the buffer for the print head at the later printing time.

3. The method of claim 2, wherein the later printing time corresponds to the time offset identified for the thermal print head.

4. The method of claim 1, wherein step (C) further comprises providing a null set to the thermal print head.

5. The method of claim 4, further comprising selecting the null set to be provided to the thermal print head responsive to the thermal print head having a temperature within a predetermined temperature range.

6. A method for printing print data using a thermal printer including a plurality of staggered thermal print heads, the method comprising:

identifying, by a controller of a thermal printer comprising a plurality of staggered thermal print heads, one of the plurality of staggered thermal print heads as a reference thermal print head;

identifying, by the controller, a time offset for each of the plurality of staggered thermal print heads, each time offset representing a printing time of the corresponding staggered thermal print head relative to the printing time of the reference thermal print head;

receiving, by the controller, a first set of print data and an identification of a first time, the first time relative to an initial printing time of the reference thermal print head;

determining, by the controller, that a first thermal print head of the plurality of staggered thermal print heads has a first time offset greater than the identified first time;

storing a subset of the first set of print data in a buffer for the first thermal print head for printing at a later printing time by the first thermal print head; and providing, by the controller, responsive to the determination, a preheat data set to the first thermal print head, responsive to the first thermal print head having a temperature below the lower limit of a predetermined range.

7. The method of claim 6, further comprising:

receiving, by the controller, an identification of a second time, the second time relative to the initial printing time of the reference thermal print head;

determining, by the controller, that the first thermal print head has a first time offset equal to or less than the identified second time; and providing, responsive to the determination, the stored subset of the first set of print data in the buffer to the first thermal print head.

8. The method of claim 6, wherein the first set of print data is identified for printing at the first time.

9. The method of claim 6, further comprising providing a null set to the first thermal print head.

10. The method of claim 6, further comprising selecting, by the controller, the null set to be provided to the first thermal print head responsive to the first thermal print head having a temperature within a predetermined temperature range.

11. A method for printing print data using a thermal printer including a plurality of staggered thermal print heads, the method comprising:

identifying, by a controller of a printer comprising a plurality of staggered thermal print heads, one of the plurality of staggered thermal print heads as a reference thermal print head;

identifying, by the controller, a time offset for each of the plurality of staggered thermal print heads, each time offset representing a printing time of the corresponding staggered thermal print head relative to the printing time of the reference thermal print head;

receiving, by the controller, a first set of print data and an identification of a first time, the first time relative to an initial printing time of the reference thermal print head; and providing, to a first thermal print head of the plurality of staggered thermal print heads by the controller, one of:

(i) a first subset of the first set of print data, if a time offset of the first print head is less than or equal to the identified first time, and (ii) preheat data set, if the time offset of the first print head is greater than the identified first time, and responsive to the first thermal print head having a temperature below the lower limit of a predetermined range;

wherein the first subset of the first set of print data is stored for printing by the first thermal print head at a later printing time if the time offset of the first thermal print head is greater than the identified first time.

12. The method of claim 11, further comprising comparing, by the controller, the time offset of the first thermal print head to the identified first time.

13. The method of claim 11, further comprising storing the first subset of the first set of print data in a buffer for the first thermal print head if the time offset of the first thermal print head is greater than the identified first time.

14. The method of claim 11, further comprising:

receiving, by the controller, an identification of a second time, the second time relative to the initial printing time of the reference thermal print head; and providing, to the first thermal print head by the controller, one of:

(i) the first subset of the first set of print data, if the time offset of the first thermal print head is less than or equal to the identified second time, and (ii) the predetermined data set if the time offset of the first thermal print head is greater than the identified second time.

15. The method of claim 11, further comprising providing a null set to the first thermal print head, responsive to the first thermal print head having a temperature within the predetermined range.

* * * * *